(12) United States Patent
Kogure

(10) Patent No.: US 12,158,948 B2
(45) Date of Patent: Dec. 3, 2024

(54) IMAGE FORMING APPARATUS CAPABLE OF EXECUTING APPLICATION PROGRAMS, CONTROL METHOD THEREFOR, AND STORAGE MEDIUM

(71) Applicant: CANON KABUSHIKI KAISHA, Tokyo (JP)

(72) Inventor: Takeshi Kogure, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 416 days.

(21) Appl. No.: 17/575,709

(22) Filed: Jan. 14, 2022

(65) Prior Publication Data
US 2022/0253521 A1 Aug. 11, 2022

(30) Foreign Application Priority Data
Feb. 10, 2021 (JP) ................................ 2021-019870

(51) Int. Cl.
*G06F 21/54* (2013.01)
*G06F 21/14* (2013.01)
(Continued)

(52) U.S. Cl.
CPC .............. *G06F 21/54* (2013.01); *G06F 21/14* (2013.01); *G06F 21/64* (2013.01); *H04L 9/3247* (2013.01); *H04L 9/3268* (2013.01)

(58) Field of Classification Search
CPC .......... G06F 21/14; G06F 21/54; G06F 21/64; H04L 9/0894; H04L 9/16; H04L 9/3242; H04L 9/3247; H04L 9/3268
See application file for complete search history.

(56) References Cited

U.S. PATENT DOCUMENTS 6,230,267 B1 * 5/2001 Richards .............. G06Q 20/355
　　　　　　　　　　　　　　　　　　713/168
7,103,779 B2 * 9/2006 Kiehtreiber ........... H04L 9/3247
　　　　　　　　　　　　　　　　　　726/22
(Continued)

FOREIGN PATENT DOCUMENTS

JP　　2001527675 A　　12/2001
JP　　2002230511 A　　8/2002
(Continued)

*Primary Examiner* — Sharon S Lynch
(74) *Attorney, Agent, or Firm* — ROSSI, KIMMS & McDOWELL LLP

(57) ABSTRACT

An image forming apparatus which is capable of effectively preventing leakage of confidential information from an application program while reducing effects on the performance of the image forming apparatus. The application program includes a plurality of control codes and a plurality of data. Each of the control codes is loaded so as to be executed. The control codes include encrypted control codes and unencrypted control codes. In a loading process, it is determined whether or not key information for use in decryption in a case where the control code to be loaded is encrypted has integrity, and it is determined whether or not the control codes including the control code to be loaded have integrity. When it is not determined that the control codes have integrity, the encrypted code to be loaded is not loaded or decrypted even if it is determined that the key information has integrity.

9 Claims, 13 Drawing Sheets

(51) Int. Cl.
  *G06F 21/64* (2013.01)
  *H04L 9/32* (2006.01)

(56) References Cited

U.S. PATENT DOCUMENTS

| | | | | |
|---|---|---|---|---|
| 7,734,923 B2 * | 6/2010 | Everett | .............. | G06Q 20/3552 |
| | | | | 380/278 |
| 8,438,392 B2 * | 5/2013 | Oxford | .............. | H04L 63/0428 |
| | | | | 713/168 |
| 9,705,677 B2 * | 7/2017 | Oxford | ................ | G06F 21/10 |
| 10,846,394 B2 * | 11/2020 | Ogura | .................... | G06F 21/51 |
| 11,218,299 B2 * | 1/2022 | Hanel | .................. | H04L 9/0894 |
| 11,323,436 B1 * | 5/2022 | Mouraveiko | ........... | H04L 49/25 |
| 11,474,855 B2 * | 10/2022 | Kogure | ................. | G06F 9/4843 |
| 2003/0037237 A1 * | 2/2003 | Abgrall | ................. | H04L 63/062 |
| | | | | 713/166 |
| 2004/0039924 A1 * | 2/2004 | Baldwin | .............. | H04L 9/0891 |
| | | | | 713/189 |
| 2005/0066169 A1 * | 3/2005 | Kiehtreiber | ............. | G06F 21/54 |
| | | | | 713/176 |
| 2007/0180276 A1 * | 8/2007 | Everett | .............. | G06K 19/0719 |
| | | | | 713/194 |
| 2010/0122088 A1 * | 5/2010 | Oxford | ................ | H04L 9/3236 |
| | | | | 380/278 |
| 2013/0238902 A1 * | 9/2013 | Oxford | ................ | H04L 9/3236 |
| | | | | 713/168 |
| 2019/0196801 A1 * | 6/2019 | Sasaki | ................... | H04L 9/3242 |
| 2020/0026554 A1 * | 1/2020 | Kogure | ................ | G06F 21/608 |

FOREIGN PATENT DOCUMENTS

| | | |
|---|---|---|
| JP | 2009258772 A | 11/2009 |
| JP | 2020016926 A | 1/2020 |

\* cited by examiner

| Application Program ID | Vender Name |
|---|---|
| Application ID 1 | Application Vender1 |
| Application ID 2 | Application Vender1 |
| Application ID 3 | Application Vender1 |
| Application ID 4 | Application Vender2 |
| Application ID 5 | Application Vender2 |
| Application ID 6 | Application Vender3 |

| Vender Name | Signature validation key |
|---|---|
| Application Vender1 | Signature validation key1 |
| Application Vender2 | Signature validation key2 |
| Application Vender3 | Signature validation key3 |

IMAGE FORMING APPARATUS CAPABLE OF EXECUTING APPLICATION PROGRAMS, CONTROL METHOD THEREFOR, AND STORAGE MEDIUM

BACKGROUND OF THE INVENTION

Field of the Invention

The present invention relates to an image forming apparatus, a control method therefor, and a storage medium, and in particular to an image forming apparatus capable of executing application programs, a control method therefor, and a storage medium.

Description of the Related Art

In an image forming apparatus, for example, to add optional functions, application programs can be installed and made executable.

In this image forming apparatus, it is likely that an application program maliciously generated by tampering may be installed and executed. In this case, it is likely that confidential information handled in the image forming apparatus may be read out by the tampered application program and leaked out.

It is thus considered that to protect confidential information of an application program, the application program is encrypted, and it is decrypted when loaded as described in Japanese Laid-Open Patent Publication (Kokai) No. 2002-230511.

However, if the entire application program is encrypted as described in Japanese Laid-Open Patent Publication (Kokai) No. 2002-230511, even non-confidential information is encrypted. As a result, when the image forming apparatus executes an application program, decryption as well as loading of the application program is always required. This affects the performance of the image forming apparatus.

To solve this problem, it is considered that a part of an application program is encrypted as described in Japanese Laid-Open Patent Publication (Kokai) No. 2009-258772.

However, if a part of an application program is encrypted, it is still likely that the application program may be maliciously tampered with, causing contents such as an encrypted file to be read out by unencrypted processing.

SUMMARY OF THE INVENTION

The present invention provides an image forming apparatus, which is capable of effectively preventing leakage of confidential information from an application program while reducing the effects on the performance of the image forming apparatus, as well as a control method therefor and a storage medium.

Accordingly, the present invention provides an image forming apparatus that is configured to execute an application program comprising a plurality of control codes and a plurality of data, the image forming apparatus comprising a controller configured to perform a loading process for loading each of the control codes constituting the application program so as to execute each of the control codes, wherein the application program includes encrypted control codes and unencrypted control codes as the plurality of control codes, wherein in the loading process, the controller determines whether or not key information for use in decryption in a case where the control code to be loaded is encrypted has integrity, and determines whether or not the control codes in the application program including the control code to be loaded have integrity, and wherein in a case where it is not determined that the control codes have integrity, the controller does not load or decrypt the encrypted control code to be loaded even if it is determined that the key information has integrity.

According to the present invention, leakage of confidential information from an application program is effectively prevented while the effects on the performance of the image forming apparatus are reduced.

Further features of the present invention will become apparent from the following description of exemplary embodiments (with reference to the attached drawings).

BRIEF DESCRIPTION OF THE DRAWINGS

FIG. 9 is a view useful in explaining a correspondence table indicating the correspondence between extension application program IDs and development vendors of extension application programs.

FIG. 10 is a view useful in explaining a correspondence table indicating the correspondence between the development vendors of the extension application programs and signature validation keys for the respective development vendors.

DESCRIPTION OF THE EMBODIMENTS

The present invention will now be described in detail below with reference to the accompanying drawings showing an embodiment thereof.

Figure 1:
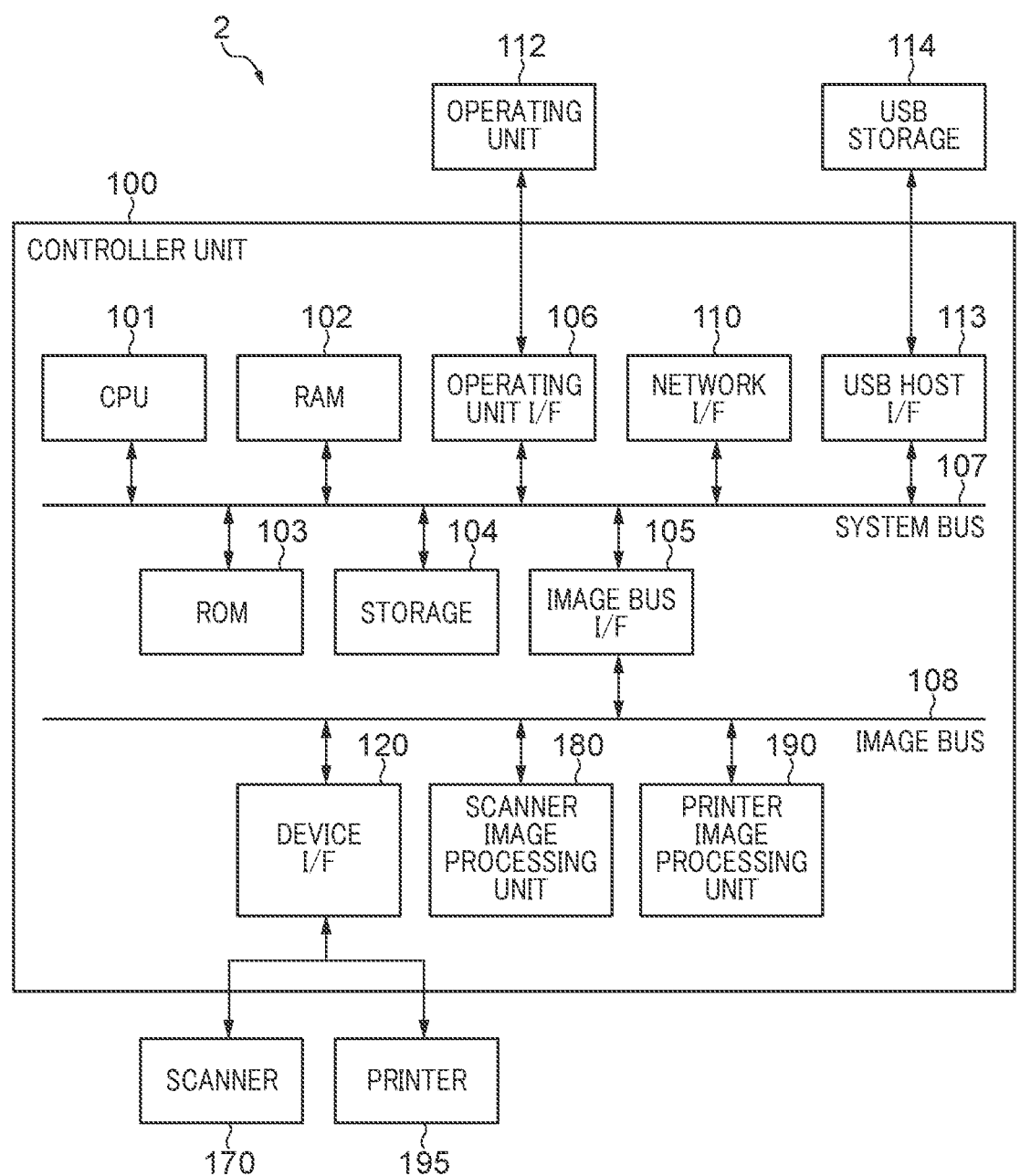
FIG. 1 is a diagram showing a hardware arrangement of an image forming apparatus according to an embodiment of the present invention.

FIG. 1 is a diagram showing a hardware arrangement of an image forming apparatus 2 according to the embodiment of the present invention.

Referring to FIG. 1, the image forming apparatus 2 has an operating unit 112, a USB storage 114, a scanner 170, a printer 195, and a controller unit 100 to which they are connected. The controller unit 100 has a CPU 101, a RAM 102, a ROM 103, a storage 104, an image bus I/F (interface) 105, an operating unit I/F 106, a network I/F 110, a USB host I/F 113, and a system bus 107 to which they are connected. An image bus 108 is connected to the image bus I/F 105. A device I/F 120, a scanner image processing unit 180, and a printer image processing unit 190 are connected to the image bus 108.

The scanner 170 and the printer 195 are connected to the device I/F 120. The scanner 170 reads an image off an original to generate image data. The printer 195 prints an image on a sheet based on image data. The device I/F 120 inputs and outputs image data relating to processing by the scanner 170 or the printer 195. The device I/F 120 may be also capable of performing synchronous or asynchronous conversion of the image data.

The scanner image processing unit 180 corrects, processes, and edits image data generated by the scanner 170.

The printer image processing unit 190 corrects image data, which is to be printed out, and converts its resolution, suitably for the printer 195.

The image bus I/F 105 is a bus bridge that connects the system bus 107 and the image bus 108, which is capable of transferring image data at high speed, together in the image forming apparatus 2. The image bus 108 may be, for example, a PCI bus (Peripheral Component Interconnect bus) or an IEEE bus.

The operating unit I/F 106 is connected to the operating unit 112. The operating unit 112 may have a touch panel that displays images and can be operated by a user. In this case, the operating unit I/F 106 outputs an image, which is to be displayed on the touch panel, to the operating unit 112, obtains input information corresponding to a user's operation on the touch panel, and outputs the input information to the CPU 101.

The network I/F 110 is connected to a LAN (which may be a communication cable 4, not shown here and described later). The network I/F 110 sends and receives data to and from other apparatuses connected to the LAN.

The USB host I/F 113 is connected to the USB storage 114. The USB storage 114 is a nonvolatile semiconductor memory. The USB storage 114 is removably connected to the image forming apparatus 2.

The USB host I/F 113 communicates with the USB storage 114, causes the USB storage 114 to store data, obtains data from the USB storage 114, and outputs the data to the CPU 101.

A plurality of USB devices including the USB storage 114 may be connected to the USB host I/F 113.

The ROM 103 and the storage 104 are nonvolatile memories. A boot program is stored in the ROM 103. Programs relating to control of the image forming apparatus 2 and various types of data for use in execution of programs are recorded in the storage 104. Image data relating to processing performed by the image forming apparatus 2 may be recorded in the storage 104.

The RAM 102 is a volatile memory. A development area for a program to be executed by the CPU 101, a work area used by the CPU 101 executing a program, a temporary storage area for image data, and so forth are provided in the RAM 102.

The CPU 101 reads and executes programs recorded in the ROM 103 and the storage 104, whereby the CPU 101 functions as a control unit (a controller) configured to control entire the image forming apparatus 2.

The CPU 101, which is a control unit, performs control for, for example, a copying function of causing the printer 195 to print image data read (scanned) in by the scanner 170.

In addition, the CPU 101 can execute operation system programs and application programs for example. Examples of the application programs include an extension application program that is added for an optional function or the like of the image forming apparatus 2.

Programs to be stored in the storage 104 by adding or updating may also be recorded in the USB storage 114. In this case, the CPU 101 reads programs from the USB storage 114 and records them in the storage 104.

Figure 2:
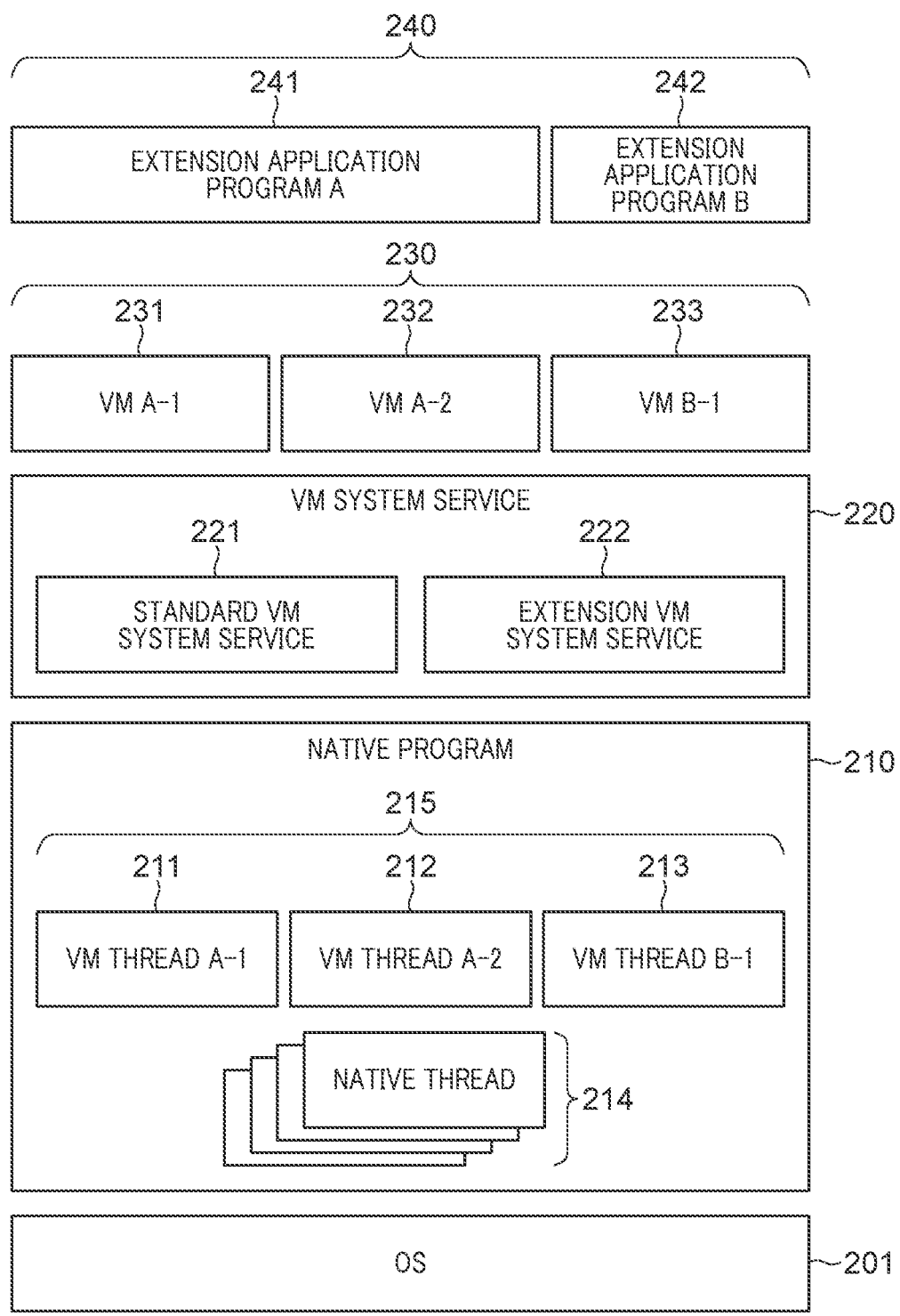
FIG. 2 is a view useful in explaining an execution environment for an extension application program, which is implemented by a software program recorded in a storage of the image forming apparatus in FIG. 1.

FIG. 2 is a view useful in explaining an execution environment for extension application programs, which are implemented by software programs recorded in the storage 104 of the image forming apparatus 2 in FIG. 1. The CPU 101 executes programs for virtual machines (VM) recorded in the storage 104 as functions of the operating system programs, whereby, the CPU 101 generates the execution environments for the extension application programs in FIG. 2 in the image forming apparatus 2.

The operating system program includes a native program 210 for implementing basic functions of the image forming apparatus 2 such as the printer 195, a FAX, and the scanner 170. The operating system program may further include programs for the virtual machines 230, which are the execution environments for the extension application programs, in addition to the native program 210.

In the execution environments for the extension application programs in FIG. 2, the native program 210, virtual machine system service 220, virtual machines 230, and extension application programs 240 are executed on an OS 201 that is an operating system.

The native program 210 has native threads 214 for controlling each component of the image forming apparatus 2 such as the printer 195, the FAX, and the scanner 170, and virtual machine threads 215 for moving the virtual machines 230.

The number of virtual machine threads 215 corresponds to the number of virtual machines 230 that are executed in the image forming apparatus 2. Here, there are three threads 211, 212, and 213 generated as the virtual machine threads 215.

The virtual machine system service 220 is a utility library shared by the extension application programs 240.

Here, a standard virtual machine system service 221 which minimally realizes the virtual machines 230 and an extension virtual machine system service 222 are illustrated as the virtual machine system service 220.

The extension virtual machine system service 222 provides access to each module of the image forming apparatus 2 and also provides OS functions.

The extension application programs 240 can access the each module of the image forming apparatus 2 by calling functions of the virtual machine system service 220. This eliminates the need to write a process by which each module of the image forming apparatus 2 is accessed in the extension application programs 240, which reduces development time and effort. By the virtual machines 230 executing an API (Application Programming Interface) ordered in byte control codes of the extension application programs 240, the virtual machine system service 220 associated with the API is called.

The standard virtual machine system service 221 includes a function of loading the extension application programs 240.

The virtual machines 230 form the execution environments for the extension application programs 240. The virtual machines 230 interpret and execute programs that control the extension application programs 240.

The extension application programs 240 always operate on the virtual machines 230. The virtual machines 230 are managed by memory spaces logically separated for the respective virtual machines 230. In principle, no memory space can be shared by different virtual machines 230.

The virtual machines 230 are generated for the respective extension application programs 240. In principle, no memory space can be shared by different extension application programs 240.

The extension application programs 240 operating on the virtual machines 230 operate in accordance with instructions exclusive to the virtual machines 230, which are different from instructions according to which they operate on the CPU 101. The instructions exclusive to the virtual machines 230 are called byte control codes. On the other hand, instructions exclusive to the CPU 101 are called native control codes.

The virtual machines 230 sequentially interpret the byte control codes and process them. The CPU 101 performs control based on the native control codes and control based on the byte control codes for the virtual machines 230, in parallel.

The virtual machines 230 include a type that sequentially interprets and processes the byte control codes as they are and a type that converts the byte control codes into the native control codes and executes them.

In the present embodiment, the virtual machines 230 are of the former type but may be of the latter type.

In general, instructions for operation on the CPU 101 are not compatible among different types of CPUs 101. Also, instructions for operation on the virtual machine 230 are not compatible among different virtual machines 230.

The virtual machines 230 in FIG. 2 are implemented as software modules operating on the CPU 101. The virtual machines 230 may also be implemented as hardware modules.

The virtual machines 230 execute the extension application programs 240.

The virtual machines 230 may be generated for respective threads of the extension application programs 240.

Referring to FIG. 2, an extension application program A 241 has two threads. In this case, a "virtual machine A-1" 231 and a "virtual machine A-2" 232 are generated as the virtual machines 230.

An extension application program B 242 has one thread. In this case, a "virtual machine B-1" 233 is generated as the virtual machine 230.

It should be noted that icons for the respective extension application programs 240 are displayed on a main menu screen displayed on the operating unit 112 of the image forming apparatus 2.

When the user selects (selection operation) one of those icons (selection operation), the operating unit I/F 106 detects the operation through the operating unit 112 and outputs details of the operation to the CPU 101. The CPU 101 starts the extension application program 240 corresponding to the icon selected by the user.

Figure 3:
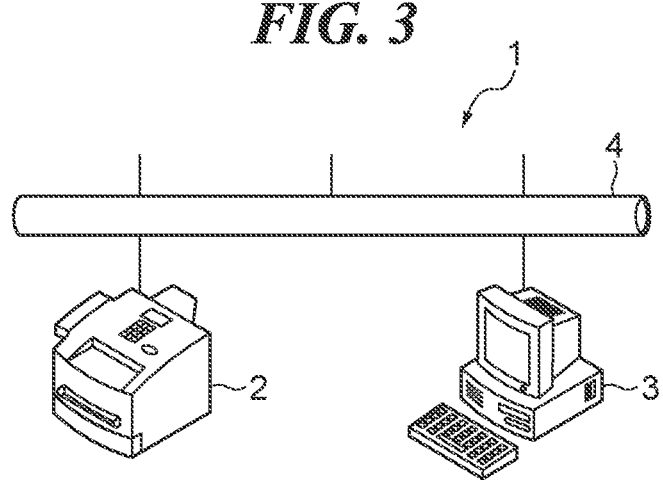
FIG. 3 is a schematic view of an image processing system including the image forming apparatus in FIG. 1.

FIG. 3 is a schematic view of an image processing system 1 including the image forming apparatus 2 in FIG. 1. A description will be given of how the extension application programs 240 are installed onto the image forming apparatus 2 in the image processing system 1.

The image processing system 1 in FIG. 3 has the image forming apparatus 2, a computer apparatus 3, and the communication cable 4 to which they are connected. The communication cable 4 complies with, for example, IEEE 802.3 or IEEE 802.11.

The computer apparatus 3 generates the extension application programs 240.

The computer apparatus 3 sends data of the extension application programs 240 to the image forming apparatus 2 using an extension application program installation means provided by the image forming apparatus 2.

As a result, the extension application programs 240 are installed onto the storage 104 of the image forming apparatus 2.

Figure 4:
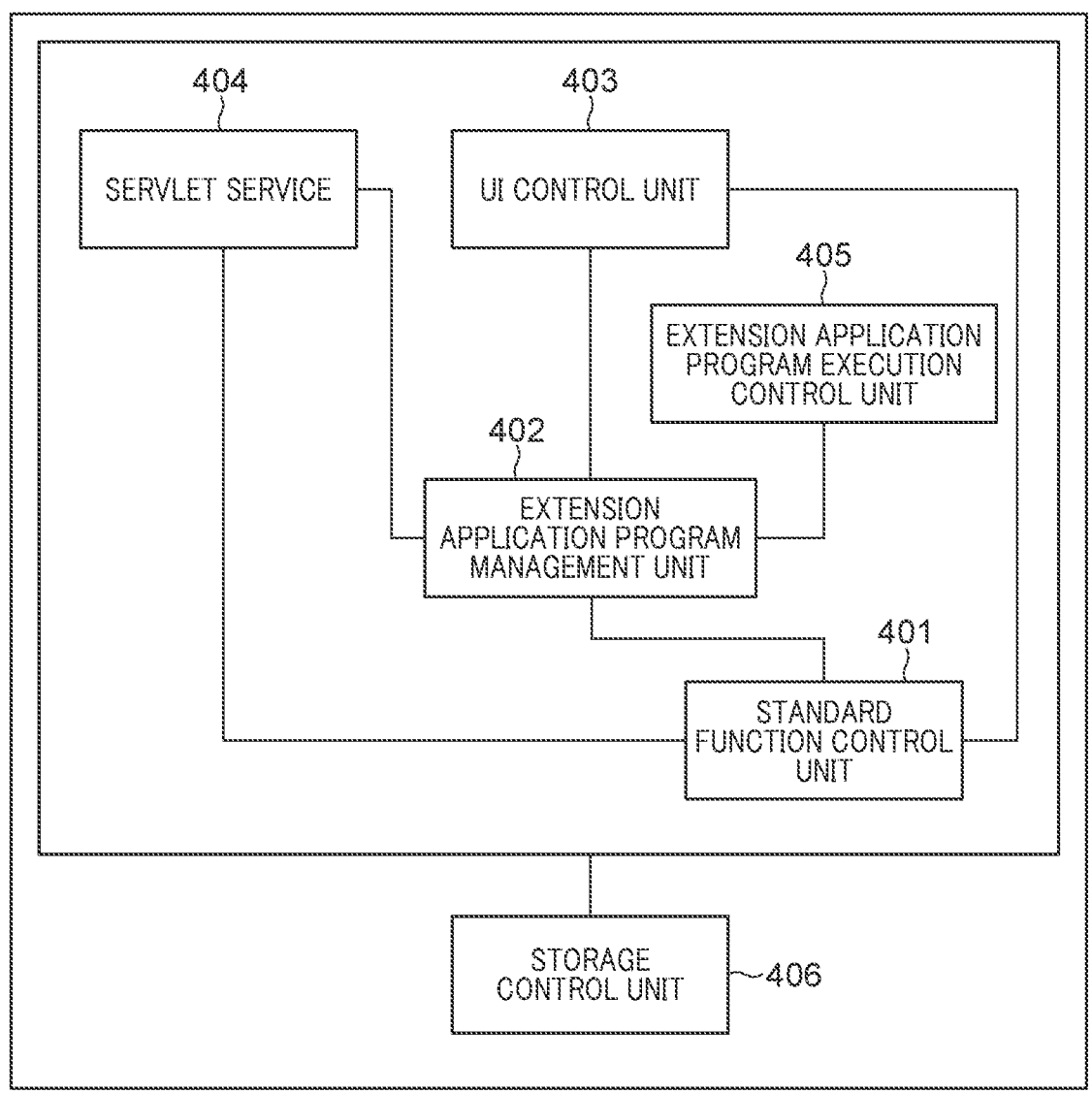
FIG. 4 is a view useful in explaining a program module for executing the extension application program, which is implemented as a part of FIG. 2 by the image forming apparatus in FIG. 1.

FIG. 4 is a view useful in explaining a program module for executing the extension application programs 240, which is implemented as a part of FIG. 2 by the image forming apparatus 2 in FIG. 1.

The program module in FIG. 4 is generated in the execution environments for the extension application programs 240 in FIG. 2.

A servlet service 404 is a module that, when accessed using HTTP through the network OF 110, receives that request and distributes processing to modules based on an accessed URL.

Examples of the modules here include an extension application program management unit 402 and a standard function control unit 401.

A UI control unit 403 is a module that displays a screen on the operating unit 112, receives an operation from the user, and notifies an appropriate module of the operational information. Examples of the module here include an extension application program management unit 402 and the standard function control unit 401.

The extension application program management unit 402 is a module that management installation of the extension application programs 240, start of the installed extension application programs 240, etc.

An extension application program execution control unit 405 is a module that controls execution of the extension application programs 240 started by the extension application program management unit 402.

The extension application program execution control unit 405 specifically controls the virtual machine threads 215, the virtual machine system service 220, the virtual machines 230, and the extension application programs 240.

The standard function control unit 401 is a module that controls a copying function and a fax function, which are standard functions of the image forming apparatus 2, and performs other types of control (for example, control of a USB host bus I/F) required for the image forming apparatus 2.

A storage control unit 406 is a module that records and manages information about settings on the image forming apparatus 2.

The modules described above refer to setting values and set values by accessing the storage control unit 406.

As described above, the image forming apparatus 2 is capable of executing the extension application programs 240 each comprised of a plurality of control codes and a plurality of data.

The image forming apparatus 2 is capable of installing and executing the extension application program 240 so as to, for example, add optional functions.

In this case, there is a possibility that in the image forming apparatus 2, the extension application programs 240 that have been, for example, maliciously tampered with may be installed and executed.

In this case, there is a possibility that confidential information handled (e.g. managed, stored) by the image forming apparatus 2 may be read by the tampered extension application programs 240 and leaked to the outside.

Figure 5:
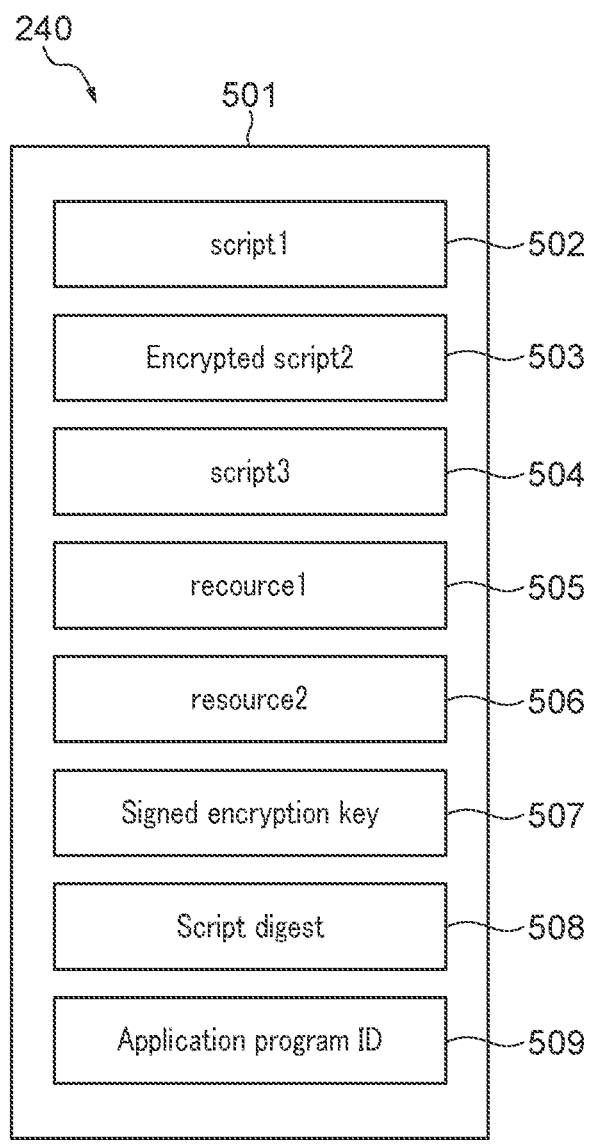
FIG. 5 is a view useful in explaining an extension application program that is optionally added to the storage of the image forming apparatus in FIG. 1.

FIG. 5 is a view useful in explaining the extension application program 240 that is optionally added to the storage 104 of the image forming apparatus 2 in FIG. 1.

An archive 501 for the extension application program 240 in FIG. 5 includes a plurality of script files including a plurality of control data that is executed as the extension application program 240.

The archive 501 includes files of various data for validating authenticity and integrity of the extension application program 240 as well as the plurality of script files.

There are roughly five types of files constituting the extension application program 240 in FIG. 5.

The files of the first type are script files 502 to 504 in which operations of the extension application program 240 are described in a program language.

The script files 502 to 504 include the script file 503 encrypted in advance. The script files 502 and 504 are unencrypted script files.

Data in the script file 503 is encrypted by an encryption key generated by a predetermined procedure. The third party cannot directly see contents of the original data in the script file 503.

The extension application program 240 is thus comprised of a plurality of script files including a plurality of control codes for the extension application program 240. A part of the plurality of script files is encrypted. Namely, a part of a plurality of control codes for the extension application program 240 is encrypted on a script-by-script basis. The extension application program 240 includes encrypted control codes and unencrypted control codes, as the plurality of control codes.

Since the encrypted script file 503 and the unencrypted script files 502 and 504 are combined together to constitute the extension application program 240, high execution performance and high confidentiality are ensured at the same time when the control codes included in those script files 502 to 504 are loaded and executed.

The files of the second type are resource files 505 and 506 in which image data, display messages, and so forth for use in an application program are stored.

The file of the third type is a key information file 507 required to decrypt confidential information.

The file of the fourth type is a script digest file 508 for checking the integrity of script files.

The script digest means a digest for use in validating the integrity of script files constituting an application program.

The script digest is generated in advance based on scripts constituting an application program.

The script digest, which is encrypted by an encryption key used to encrypt a script, is recorded in the file 508 in that state.

The file of the fifth type is a file 509 of an application program ID that identifies an application program.

The application program ID is an ID unique to each application program.

The number of files of each type varies with application programs.

Figure 6:
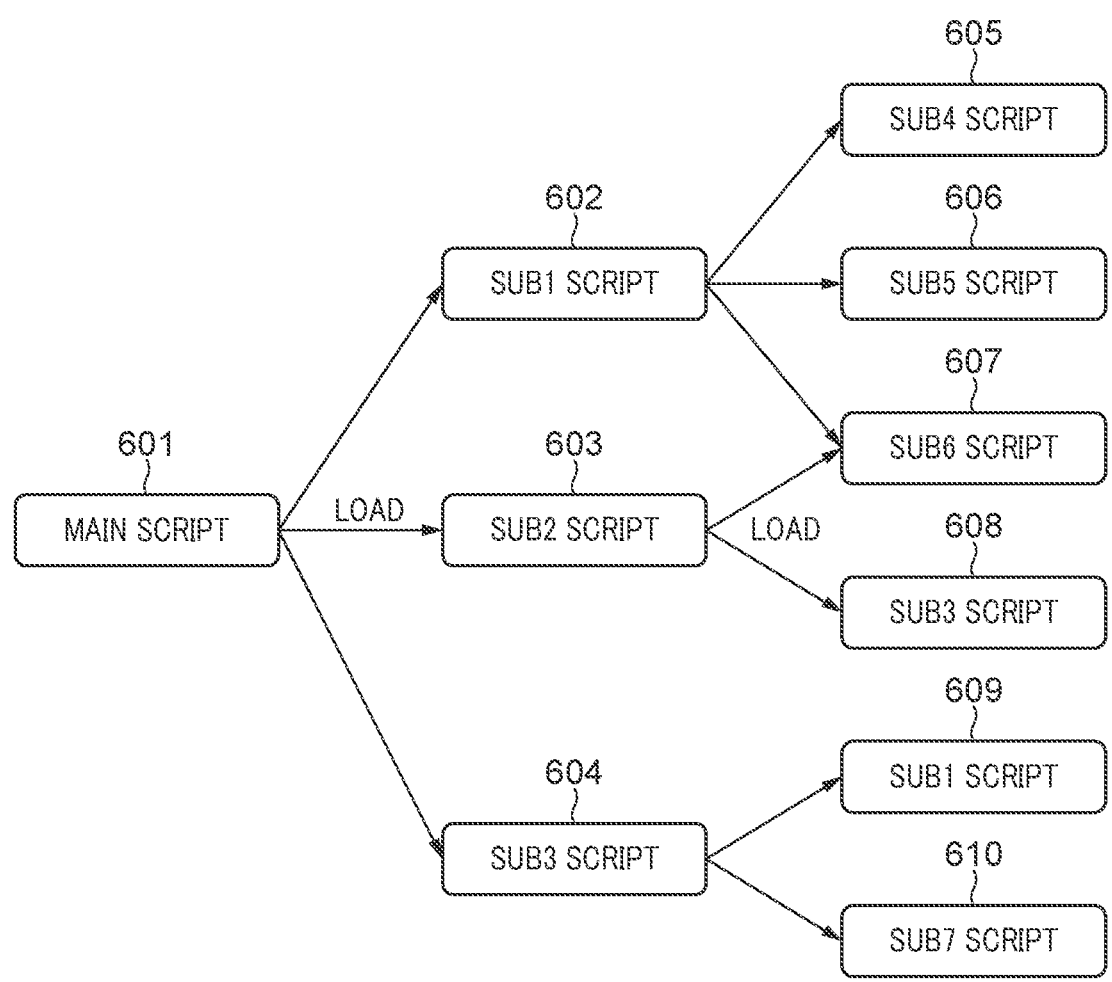
FIG. 6 is a diagram useful in explaining the dependence relationship among a plurality of script files for the extension application program in FIG. 5.

FIG. 6 is a diagram useful in explaining the dependence relationship among a plurality of script files for the extension application program 240 in FIG. 5.

In general, to execute the extension application program 240, the computer apparatus 3 loads and develops the whole of executable files into memory and then executes them.

The image forming apparatus 2 does not always have enough memory capacity unlike the computer apparatus 3.

For this reason, in the image forming apparatus 2, the control codes for the extension application program 240 are divided into a plurality of files on, for example, a function-by-function basis, and recorded. To execute the extension application program 240, the image forming apparatus 2 sequentially reads the control codes for each script file and loads and executes the control codes as the need arises.

This reduces memory amount required to execute the extension application program 240 in the image forming apparatus 2.

Referring to FIG. 6, when executing the extension application program 240, first, the CPU 101 of the image forming apparatus 2 loads and executes a main script file 601.

After loading and executing the main script file 601, the CPU 101 loads and executes a sub1 script file 602, a sub2 script file 603, and a sub3 script file 604.

After loading and executing the sub1 script file 602, the CPU 101 loads and executes a sub4 script file 605, a sub5 script file 606, and a sub6 script file 607.

After loading and executing the sub2 script file 603, the CPU 101 loads and executes a sub6 script file 607 and a sub3 script file 608.

After loading and executing the sub3 script file 604, the CPU 101 loads and executes a sub1 script file 609 and a sub7 script file 610.

It should be noted that the order in which the script files are executed, that is, the dependence relationship among the script files varies with the extension application programs 240.

Further, in one extension application program 240, the dependence relationship among the script files also varies with processes.

For example, even when the CPU 101 has loaded and executed the main script file 601, there are cases where CPU 101 loads and executes only the sub1 script file 602 and the sub2 script file 603. In this case, the CPU 101 does not load or execute the sub3 script file 604.

Figure 7:
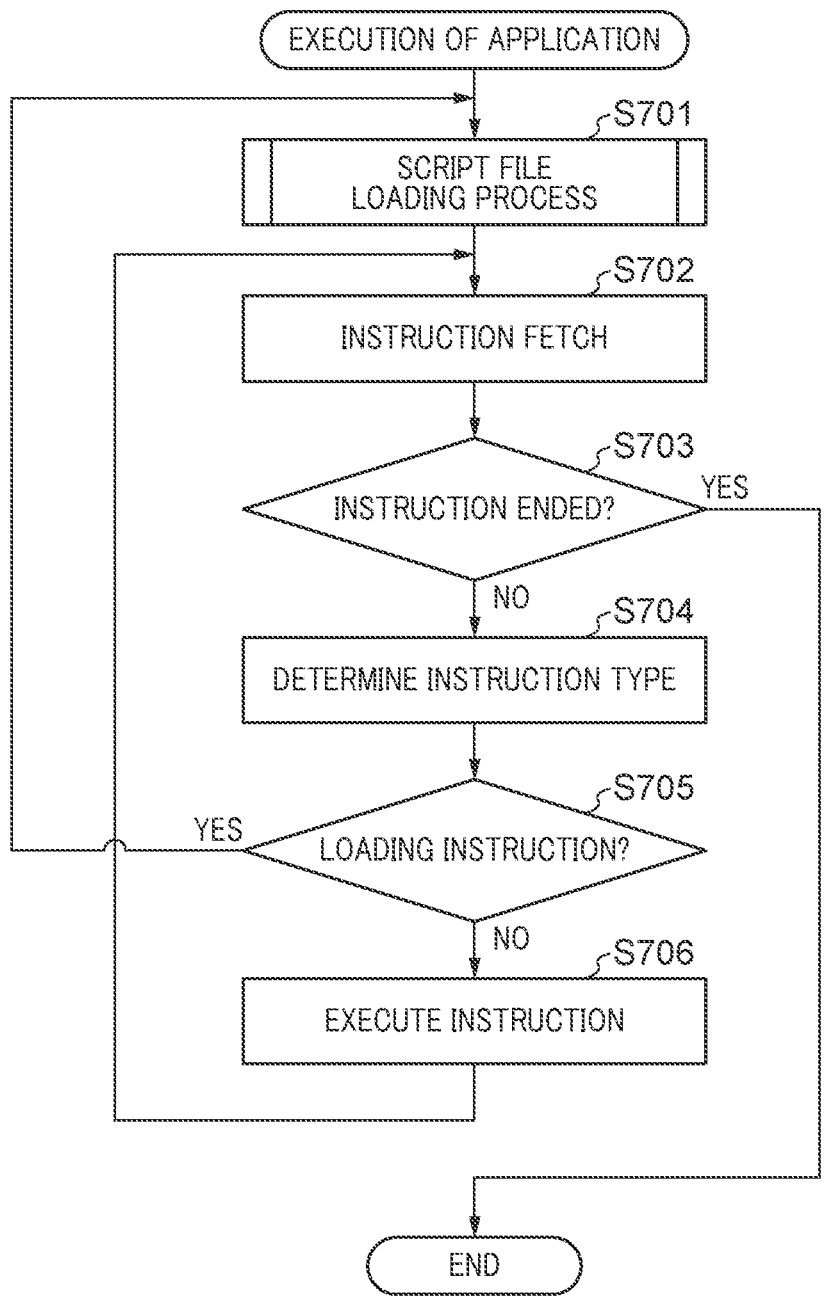
FIG. 7 is a flowchart showing how execution of the extension application program in FIG. 5 is controlled.

FIG. 7 is a flowchart showing how the execution of the extension application program 240 in FIG. 5 is controlled.

The CPU 101 of the image forming apparatus 2 implements the execution environment in FIG. 2 so as to execute the extension application program 240.

The CPU 101 performs control in FIG. 7 as, for example, a part of processing by the standard virtual machine system service 221.

In step S701, the CPU 101 loads a script file to be executed next in the extension application program 240.

In a case where the script file to be loaded is encrypted, the CPU 101 decrypts it.

The CPU 101 can develop a plurality of control codes, which are included in the loaded script file, on the RAM 102.

In step S702, the CPU 101 performs instruction fetching for the loaded script file. Unprocessed control codes included in the loaded script file are read into the CPU 101 sequentially line by line.

In step S703, the CPU 101 determines whether or not the instructions have ended. The CPU 101 sequentially fetches the plurality of codes included in the loaded script file. After the last control code in the loaded script file fetched, there is no unprocessed control code left. When the CPU 101 cannot read unprocessed control codes by performing instruction fetching, the CPU 101 determines that the instructions have ended and ends the present process. When the CPU 101 determines that the instructions have not ended, the CPU 101 proceeds the process to step S704.

In step S704, the CPU 101 determines an instruction type of the fetched control codes.

In step S705, the CPU 101 determines whether or not the instruction type determined in the step S704 is a "loading instruction". When the CPU 101 determines that the instruction type is the loading instruction, the CPU 101 returns the process to the step S701. The CPU 101 carries out the processes in the step S701 and the subsequent steps again to load other script files relating to the loading instruction. When the CPU 101 determines that the instruction type is not the loading instruction, the CPU 101 proceeds the process to step S706.

In the step S706, the CPU 101 executes the fetched control codes as the instructions. After that, the CPU 101 returns the process to the step S702. The CPU 101 continues to execute the plurality of control codes in the script file loaded in the step S701 until it determines in the step S703 that the instructions have ended.

As described above, in the present embodiment, during the execution of the extension application program 240, the plurality of control codes included in the extension application program 240 are executed as the need arises on a script file-by-script file basis.

The CPU 101 acts as a loading means to load and execute each control code constituting the extension application program 240.

Figure 8:
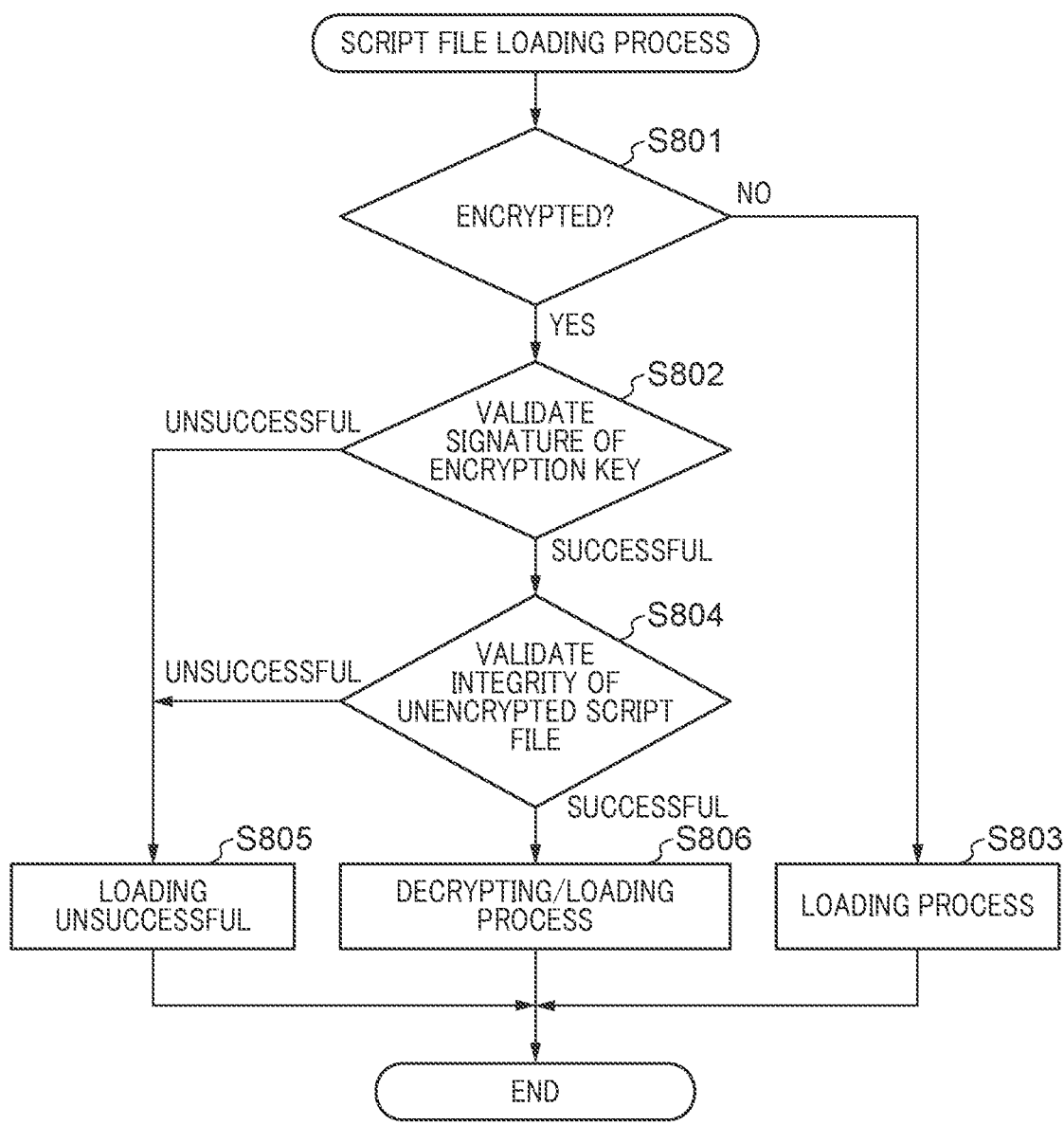
FIG. 8 is a flowchart showing in detail a script file loading process in FIG. 7.

FIG. 8 is a flowchart showing in detail the script file loading process in FIG. 7. In the script file loading process in FIG. 7, the CPU 101 acts as the loading means to carry out the process in FIG. 8.

In step S801, the CPU 101 determines whether or not control codes in a script file to be loaded are encrypted.

As a result, the CPU 101 acts as an encryption determination means to determine whether or not the script file for the control codes to be loaded are encrypted.

When the CPU 101 determines that the control codes are encrypted (there is encryption), the CPU 101 proceeds the process to step S802. When the CPU 101 determines that the control codes are not encrypted (there is no encryption), the CPU 101 proceeds the process to step S803.

In the step S802, the CPU 101 carries out a key validation process to validate a signature in key information. The CPU 101 validates that the key information is an encryption key for an application program indicated by the file 509 of an application program ID.

Thus, the CPU 101 acts as a key information validation means to check the integrity of the key information for use in decryption in the case where the control codes of the script file to be loaded are encrypted.

When the validation of the key information in the step S802 is successful, that is, the integrity of the key information is validated, the CPU 101 decrypts the key information using a private key held in the application program management unit 402, followed by the process proceeding to step S804. When the validation is not successful and the integrity of the key information is not validated, that is, the script file with the encrypted control codes cannot be loaded, the CPU 101 proceeds the process to step S805 (loading unsuccessful).

In the step S804, the CPU 101 carries out a control code validation process to validate the integrity of the script file using information about a script digest, for all a plurality of unencrypted script files constituting the application program.

Thus, the CPU 101 acts as a control code validation means to check the integrity of all script files for the extension application program 240 including the script file having the control codes to be loaded. The CPU 101 is capable of substantially checking the integrity of all control codes of the extension application program 240.

When the validation in the step S804 is successful, that is, when the CPU 101 could validate the integrity of the control codes (there is integrity), the CPU 101 proceeds the process to step S806. When the validation is not successful, that is, when the CPU 101 could not validated the integrity of the control codes (there is no integrity), the CPU 101 proceeds the process to the step S805.

The process in the step S805 is a process to be carried out in a case where validation of a script file to be loaded is not successful in the step S802 or the step S804. The CPU 101 carries out the process to be carried out in a case where loading is unsuccessful because a script file cannot be safely decrypted. After that, the CPU 101 ends the script file loading process.

As described above, even in the case where the integrity of key information has been validated, the CPU 101 does not load a script file having encrypted control codes to be loaded when the integrity of the control codes has not been validated. Since the CPU 101 does not load the script file having the encrypted control codes, the CPU 101 does not execute the control codes either.

The process in the step S806 is a process to be carried out in a case where validation of a script file to be loaded is successful in both the step S802 and the step S804. The CPU 101 carries out a loading process and a decryption process for the script file because the CPU 101 determined that the script file can be safely decrypted.

The CPU 101 decrypts a plurality of control codes in a script file using a private key held in the application program management unit 402 described above.

Thus, the CPU 101 acts as the loading means to load and decrypt a script file having encrypted control codes only in a case where both the integrity of key information and the integrity of the control codes have been validated After that, the CPU 101 ends the script file loading process.

The process in the step S803 is a process to be carried out in a case where a script file to be loaded is unencrypted. The CPU 101 loads the script file in plain text.

Thus, in a case where the CPU 101 determines that control codes of a script file to be loaded is unencrypted, the CPU 101 acts as the loading means to load the said script file having the said control codes as it is.

After that, the CPU 101 ends the script file loading process.

When an application program is to be executed, all of a plurality of scripts (see FIG. 6) constituting the application program are not collectively loaded first, but the script files are loaded for processing as the need arises.

Then, only when loading a script file including encrypted confidential information, the CPU 101 decrypts the script file after checking its integrity.

On the other hand, when loading an unencrypted script file, the CPU 101 loads the script file immediately after checking only whether or not there is encryption.

The time that elapses from a start of loading of an unencrypted file to the unencrypted file becoming executable is shortened.

As a result, in the present embodiment, script files can be loaded at high speed as compared to the case where all script files constituting an application program are encrypted.

As for encrypted script files, a signature for an encryption key is validated, and in addition, the integrity of a plurality of script files constituting an application program is validated. As a result, in a case where a part of a plurality of unencrypted script files constituting an application program has been maliciously tampered with, it can be detected that the script files do not have integrity. Namely, before loading of encrypted script files is actually performed, it can be determined that an application program does not have integrity. It is thus possible to prevent an encrypted script file from being decrypted in an application program that has been maliciously tampered with.

Figure 11:
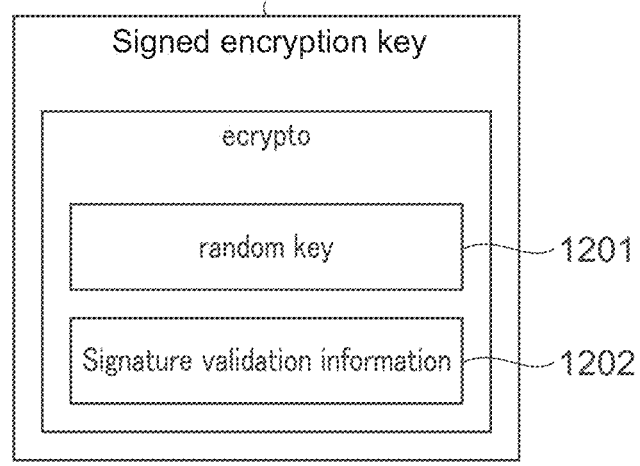
FIG. 11 is a view useful in explaining key information.

Referring to FIGS. 9 to 11, a description will be given of data of the extension application programs 240, which is used in loading script files of the extension application programs 240.

The data shown in FIGS. 9 to 11 may be recorded in the storage 104 as part of the extension application programs 240.

When loading script files to execute the extension application programs 240, the CPU 101 can read the data in FIGS. 9 to 11 as occasion demands and use them for validation. The data shown in FIGS. 9 to 11 can be recorded in their original formats in the storage 104, or may be modified such that they will not affect validation and then recorded in the storage 104.

FIG. 9 is a view useful in explaining a correspondence table 901 indicating the correspondence between extension application program IDs and development vendors of the extension application programs 240.

The correspondence table 901 in FIG. 9 may be recorded as data in the storage 104 of the image forming apparatus 2 in FIG. 1 for the extension application programs 240 in FIG. 5.

The correspondence table 901 in FIG. 9 has a plurality of records for the respective extension application programs 240. Each record includes an extension application program ID and a vender name of a development vendor.

FIG. 10, which is related to FIG. 9, is a view useful in explaining a correspondence table 1001 that is data recorded in the storage 104 of the image forming apparatus 2 and indicates the correspondence between the development venders of the extension application programs 240 and signature validation keys for the respective development vendors.

The correspondence table 1001 in FIG. 10 has records for the respective development vendors included in the correspondence table 901 in FIG. 9. Each record includes a vender name of a development vender for the extension application program 240 and a signature validation key that is used by the development vender to encrypt the extension application programs 240.

To validate a signature of an encryption key in the step S802, the CPU 101 identifies key information, which is used to validate the signature of the encryption key for the extension application program 240, by referring to the correspondence table 901 in FIG. 9 and the correspondence table 1001 in FIG. 10.

FIG. 11 is a view useful in explaining the key information 507 that is data recorded in the storage 104 of the image forming apparatus 2 in FIG. 1 for the extension application program 240 in FIG. 5.

The key information 507 in FIG. 11 is a signed encryption key and includes a random key 1201, which is required to decrypt an encrypted script file, and signature validation information 1202 for the random key 1201. The signature validation information 1202 is signature information for an encryption key.

As a result, the CPU 101 acts as a loading means to decrypt an encrypted control code using the key information 507 included in the extension application program 240.

The CPU 101 decrypts a control code in a script file by decrypting data in the script file of the extension application program 240 using the random key 1201 in the key information 507 as encryption key information.

The signature validation information 1202, which is a signature for a random key 1201, is given by a key for signing, which is managed with respect to each of the development venders of the extension application programs 240. A signature of a random key can be used to validate a signature of encryption key information.

Two pieces of information including the random key 1201 and signature validation information 1202 for the random key 1201 are encrypted by a public key, which pairs up with a private key held by the extension application program management unit 402, in key information recorded in the storage 104. The public key pairing up with the private key can be stored in advance in the storage 104 of the image forming apparatus 2. The CPU 101 thus acts as a loading means to validate signature validation information using public keys stored in advance in the storage 104 of the image forming apparatus 2.

Here, a key for signing is managed for each development vender of the extension application programs 240. Alternatively, for example, a key for signing may be managed for each extension application programs 240.

Figure 12:
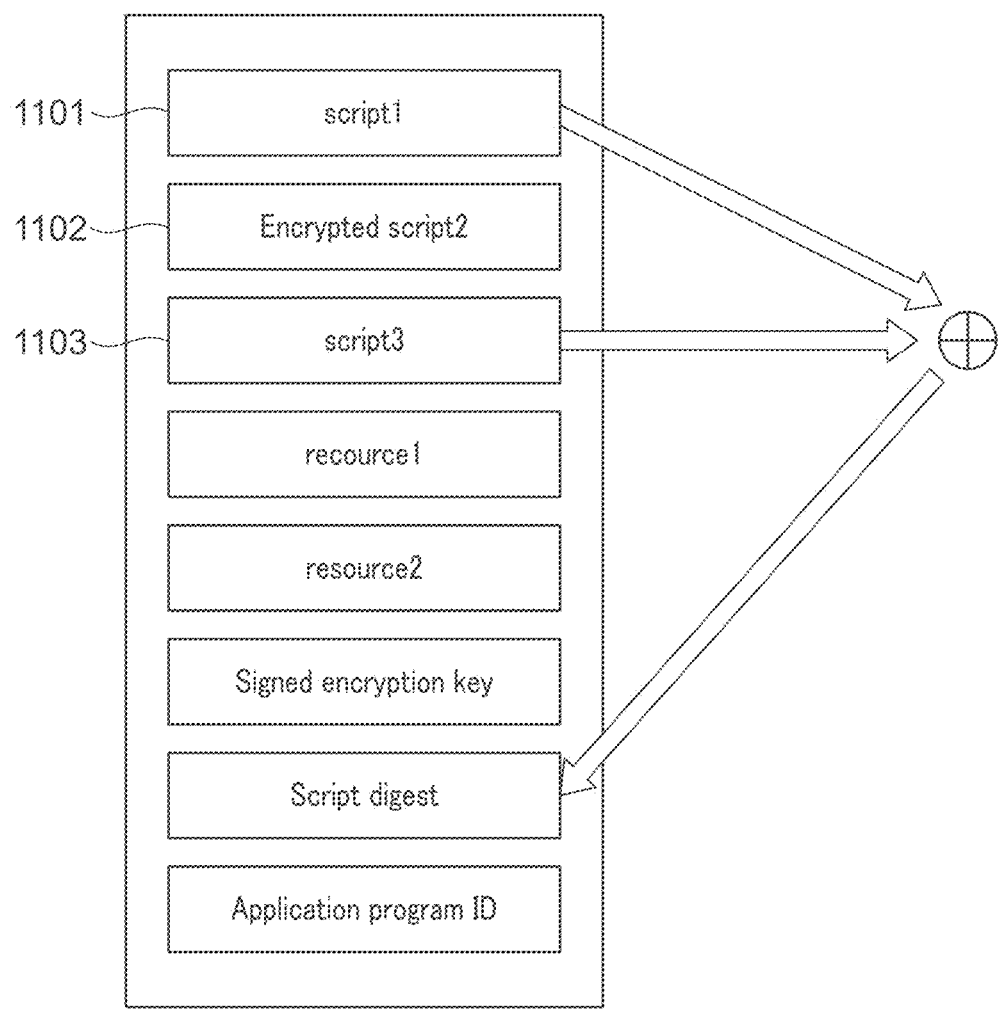
FIG. 12 is a view useful in explaining a script digest.

FIG. 12 a view useful in explaining a script digest, which is data recorded in the storage 104 of the image forming apparatus 2 in FIG. 1 for the extension application program 240 in FIG. 5.

In FIG. 12, a plurality of files in the extension application program 240, which are the same in FIG. 5, are shown.

Based on the plurality of files constituting the extension application program 240, a development vender of the extension application program 240 generates data of the script digest so as to check integrity.

In the example illustrated in FIG. 12, the development vender generates the data of the script digest for all unencrypted script files 1101, 1103 among script files constituting the extension application program 240. The script digest should be data representing the overall state of basically all script files constituting the extension application program 240. The script digest may be data representing the overall state of a part of a plurality of script files constituting the extension application program 240. The script digest may also be data representing the overall state of all script files that can be modified. The development vender can generate, for example, a value obtained by summing sizes of all the unencrypted script files 1101 and 1103, as data of the script digest. By excluding a script file 1102 that is encrypted and unlikely to directly tampered with, the amount of calculation required for processing is reduced at the time when the script digest is generated and when the integrity is checked using the script digest.

The data of the script digest is encrypted using an encryption key used to encrypt the script files and stored in a file of the script digest in the extension application program 240. As a result, the data of the script digest is included in the extension application program 240 as part of the extension application program 240.

Thus, the extension application program 240 includes the script digest for checking the integrity of control codes in the extension application program 240 as a piece of a plurality of data used by the control codes. The script digest, which is control code validation information, is generated from digests of all the unencrypted script files in the extension application program 240 and encrypted using key information.

When loading script files of control codes, the CPU 101 acts as a control code validation means to validate the integrity of the control codes using a script digest in the extension application program 240. Here, the script digest is for all unencrypted script files, in the extension application program 240, that can be modified. Namely, the CPU 101, which is the control code validation means, is capable of checking the integrity of a plurality of codes constituting the extension application program 240, including control codes which are going to be loaded, using the control code validation information.

It should be noted that as distinct from the process described above, the development vender may generate data of a script digest based on a plurality of files, which are all files constituting the extension application program 240. The development vender may generate the data of the script digest based on the plurality of files, according to a rule for generating script digest data at their company. For example, the development vender may intentionally include a dummy script file, which is not required for execution of the extension application program 240, in the extension application program 240 without encrypting it. In this case, data of a script digest is generated so that no dummy script file is included in it. The development vender should at least generate data of a script digest, according to a predetermined rule, based on a plurality of script files constituting the extension application program 240.

A description will now be given of an example of tampering that can be prevented by the image forming apparatus 2 according to the present embodiment described above.

Figure 13:
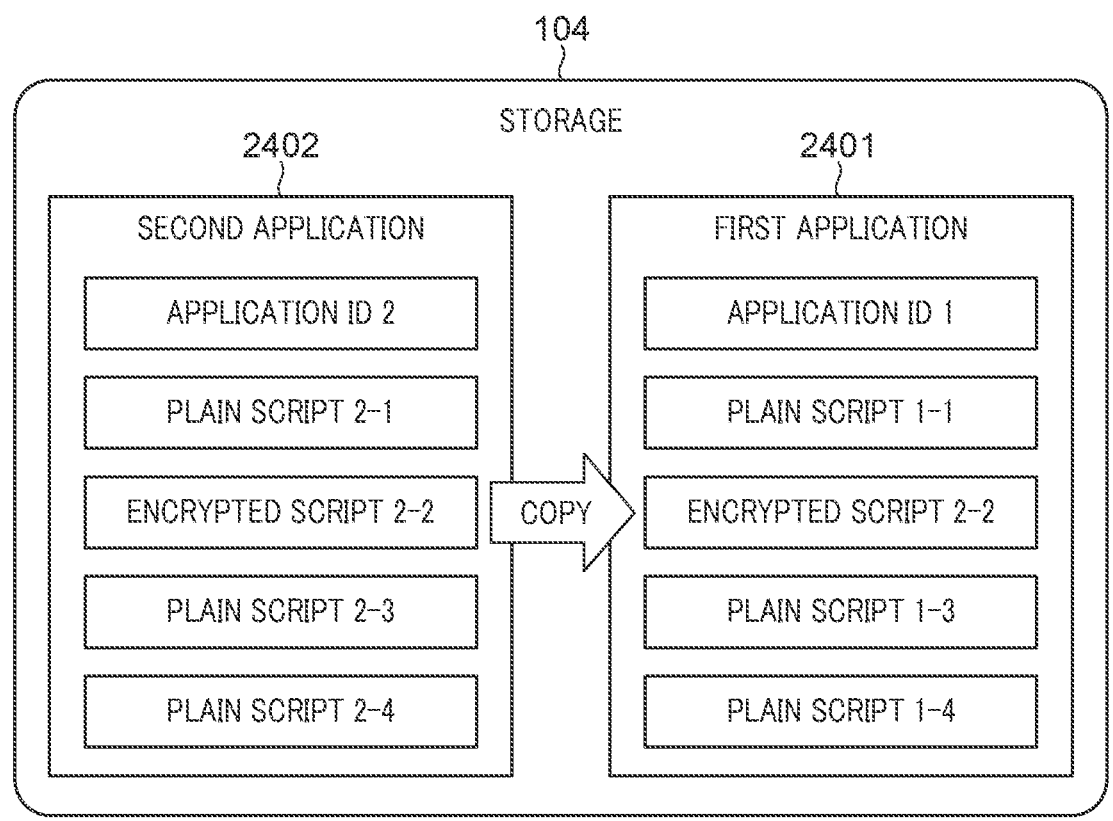
FIG. 13 is a view useful in explaining an example of a problem that would arise in an image forming apparatus to which the present embodiment is not applied.

FIG. 13 is a view useful in explaining an example of a problem that would arise in the image forming apparatus 2 to which the present embodiment is not applied.

Referring to FIG. 13, a first application 2401 and a second application 2402 are recorded in the storage 104 of the image forming apparatus 2.

The second application 2402 is the extension application program 240, which is authorized and uses confidential information.

The second application 2402 has an application program ID file (ID2), a plurality of unencrypted, plain script files (2-1, 2-3, 2-4), and an encrypted script file (2-2).

The first application 2401 was generated by a malicious user copying the second application 2402 and tampering with it.

In the case where the present embodiment is not applied to the image forming apparatus 2, when the first application 2401 is executed in the image forming apparatus 2, the CPU 101 loads and decrypts a file of an encrypted script, which has been maliciously copied to the first application 2401. As a result, details of processing by the encrypted script are developed in plain text in the virtual machine 230 for the first application 2401. The malicious user is able to obtain confidential information developed in plain text.

On the other hand, in the case where the present embodiment is applied to the image forming apparatus 2, the CPU 101 carries out the processes in the steps S801 to S804 in FIG. 8 before loading the file of the encrypted script. Thus, the CPU 101 cannot load the file of the encrypted script in the first application 2401. Details of processing by the encrypted script are not developed in plain text in the virtual machine 230 for the first application 2401. Since confidential information is not developed in plain text, the malicious user is not able to obtain it.

Figure 14:
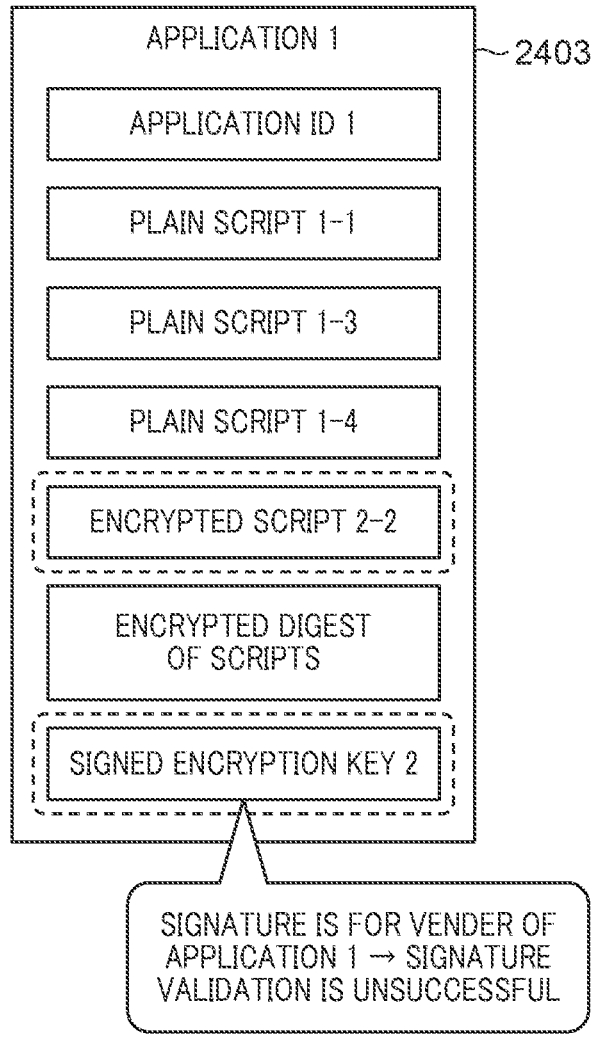
FIG. 14 is a view useful in explaining an example of application program tampering that can be prevented by the present embodiment.

FIG. 14 is a view useful in explaining an example of application program tampering that can be prevented by the present embodiment.

FIG. 14 shows a first application 2403 that is generated by the authorized second application 2402 being tampered. The first application 2403 has the same resource file, key information file, and script digest file as those of the second application 2402.

The CPU 101 according to the present embodiment validates a signature in key information in the step S802 in FIG. 8 before loading a file of an encrypted script. A file of key information in the first application 2403 generated by tampering is a file of the same key information as that of the authorized second application 2402 and does not match key information corresponding to a development vender of the first application 2403 (see FIG. 10). In this case, the CPU 202 determines in the step S802 that the key information is not an encryption key intended for an application program indicated by the application program ID 509, and does not load the file of the encrypted script.

As a result, confidential information is not developed in plain text, and hence the malicious user is not able to obtain the confidential information.

Figure 15:
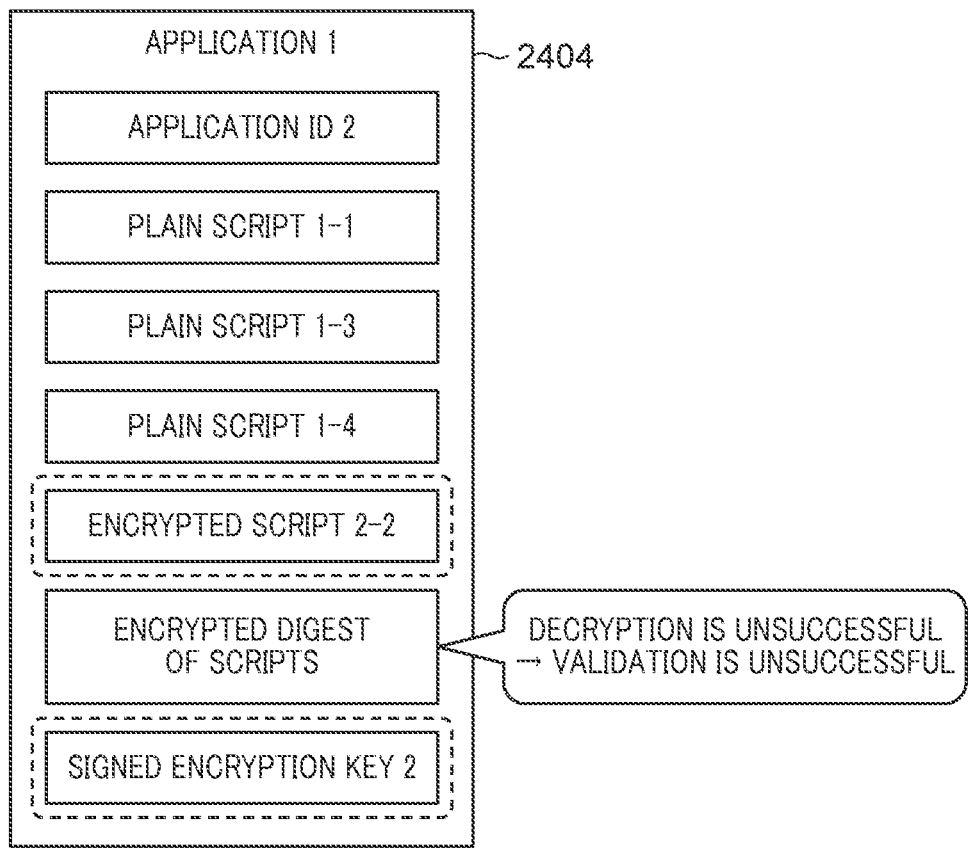
FIG. 15 is a view useful in explaining another example of application program tampering that can be prevented by the present embodiment.

FIG. 15 is a view useful in explaining another example of application program tampering that can be prevented by the present embodiment.

FIG. 15 shows the example in which in a resource file is forged in a first application 2404 generated by tampering in FIG. 14.

In the step S804, the CPU 101 validates the integrity of the script file using script digest information, for all a plurality of unencrypted script files constituting an application program. In this example, the CPU 101 determines that the script files do not have integrity.

As a result, the CPU 101 does not load files of encrypted scripts. Confidential information is not developed in plain text, and hence a malicious user is not able to obtain it.

Figure 16:
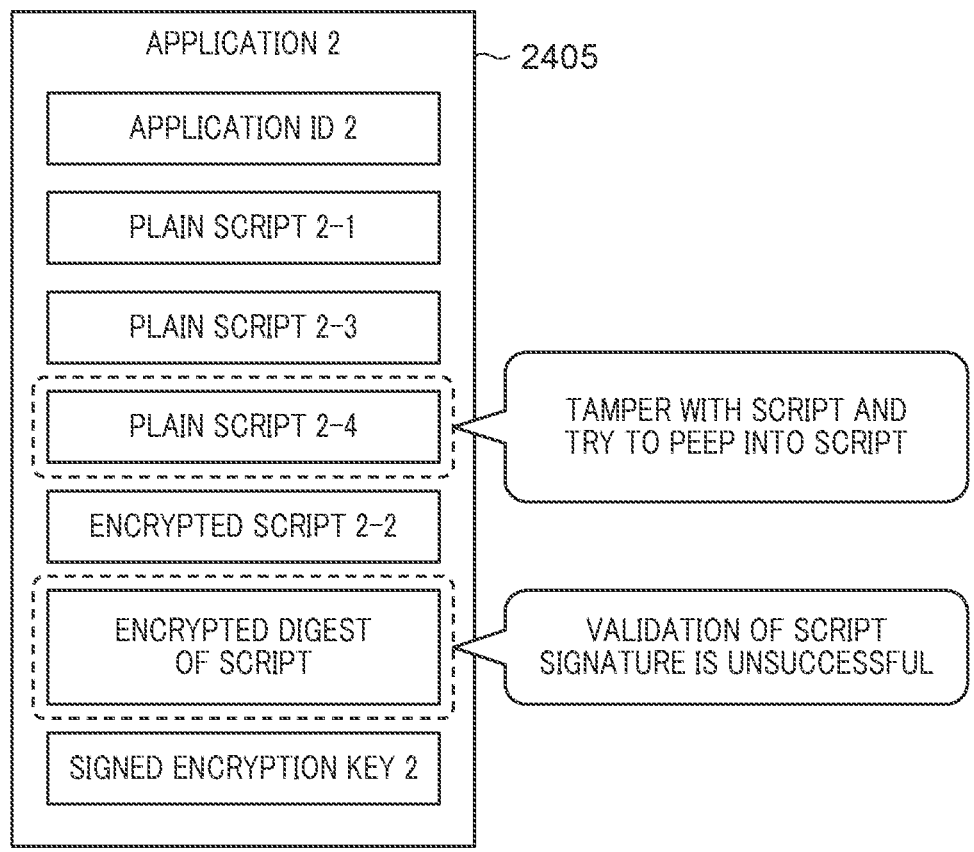
FIG. 16 is a view useful in explaining another example of application program tampering that can be prevented by the present embodiment.

FIG. 16 is a view useful in explaining another example of application program tampering that can be prevented by the present embodiment.

A malicious user tampers with a file of a plain script in the second application 2402 and obtains a tampered second application 2405 such that in the tempered second application 2405, information in a file of an encrypted script is obtained through the tampered plain script.

In the step S804, the CPU 101 validates the integrity of the script file using script digest information, for all a plurality of unencrypted script files constituting an application program. In this example, the CPU 101 determines that the script files of the tampered second application 2405 do not have integrity.

As a result, the CPU 101 does not load files of encrypted scripts. Confidential information is not developed in plain text, and hence a malicious user is not able to obtain it.

As described above, in the present embodiment, in a case where a control code to be loaded is encrypted, its integrity is checked in terms of a plurality of points. Specifically, in the present embodiment, the integrity of key information for use in decrypting an encrypted control code, and the integrity of control codes in the extension application program 240 including the control code to be loaded are checked. In the present embodiment, when the integrity of control codes has not been validated, loading or decryption of an encrypted control code to be loaded is not performed even if the integrity of key information has been validated. In the present embodiment, an encrypted control code is loaded and decrypted only when the integrity of key information has been validated and also the integrity of control codes has been validated.

Thus, in the present embodiment, for example, in a case where a part of the extension application program 240 with authenticity has been tampered with, an encrypted control code in the tampered extension application program is prevented from being decrypted. In the tampered extension application program, it is likely that the integrity of the same code as that in the original extension application program 240 will not be validated because of tampering.

In the present embodiment, by including an unencrypted control code in the extension application program 240, the effects on the performance of the image forming apparatus 2 are reduced. Moreover, in the present embodiment, the unencrypted control code effectively prevents leakage of confidential information from the extension application program 240.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-019870, filed on Feb. 10, 2021, which is hereby incorporated by reference herein in its entirety.

What is claimed is:

1. An image forming apparatus that is configured to execute an application program comprising a plurality of control codes, an encryption key, an encrypted script digest, and an application ID, a script digest being generated from all unencrypted control codes among the plurality of control codes, the encrypted script digest being generated by encryption of the script digest with the encryption key, and encrypted one or more control codes being generated by encryption of one or more control codes among the plurality of control codes with the encryption key,
   the image forming apparatus comprising a controller configured to perform
   a loading process for loading each of the plurality of control codes constituting the application program so as to execute each of the plurality of control codes,
   an encryption key validation process for validating integrity of the encryption key used for decrypting the encrypted one or more control codes, wherein integrity of the encryption key signed by a signature validation key is validated with the signature validation key corresponding to an application vendor corresponding to the application ID, and
   a control code validation process for validating an integrity of the all unencrypted control codes by using the all unencrypted control codes among the plurality of control codes and the encrypted script digest, the control code validation process being performed after the encryption key validation process,
   wherein, in a case where a first target control code is not encrypted, the first target control code of the plurality of control codes is loaded without executing both the encryption key validation process and the control code validation process, and
   wherein, in a case where a second target control code is encrypted, the encryption key validation process and the control code validation process are executed, and then the second target control code is loaded in a case where the integrity of the encryption key and the integrity of the all unencrypted control codes are both validated.

2. The image forming apparatus according to claim 1,
   wherein the application program comprises a plurality of scripts including the plurality of control codes for the application program, and
   wherein a part of the plurality of control codes in the application program is encrypted on a script-by-script basis.

3. The image forming apparatus according to claim 1,
   wherein the application program includes an unencrypted dummy control code not required for executing the application, and the script digest is generated from the all unencrypted control codes without the unencrypted dummy control code.

4. A control method for an image forming apparatus that is configured to execute an application program comprising a plurality of control codes, an encryption key, an encrypted script digest, and an application ID, a script digest being generated from all unencrypted control codes among the plurality of control codes, the encrypted script digest being generated by encryption of the script digest with the encryption key, and encrypted one or more control codes being generated by encryption of one or more control codes among the plurality of control codes with the encryption key, the control method comprising:
   carrying out a loading process for loading each of the plurality of control codes constituting the application program so as to execute each of the plurality of control codes;
   carrying out an encryption key validation process for validating integrity of the encryption key used for decrypting the encrypted one or more control codes, wherein integrity of the encryption key signed by a signature validation key is validated with the signature validation key corresponding to an application vendor corresponding to the application ID; and carrying out a control code validation process for validating an integrity of the all unencrypted control codes by using the all unencrypted control codes among the plurality of control codes and the encrypted script digest, the control code validation process being performed after the encryption key validation process, wherein, in a first case where a first target control code is not encrypted, the first target control code of the plurality of control codes is loaded without executing both the encryption key validation process and the control code validation process, and wherein, in a second case where a second target control code is encrypted, the encryption key validation process and the control code validation process are executed, and then the second target control code is loaded in a case where the integrity of the encryption key and the integrity of the all unencrypted control codes are both validated.

5. The control method according to claim 4, wherein the application program comprises a plurality of scripts including the plurality of control codes for the application program, and wherein a part of the plurality of control codes in the application program is encrypted on a script-by-script basis.

6. The control method according to claim 4, wherein the application program includes an unencrypted dummy control code not required for executing the application, and the script digest is generated from the all unencrypted control codes without the unencrypted dummy control code.

7. A non-transitory storage medium storing a program for causing a computer to execute a control method for an image forming apparatus that is configured to execute an application program comprising a plurality of control codes, an encryption key, an encrypted script digest, and an application ID, a script digest being generated from all unencrypted control codes among the plurality of control codes, the encrypted script digest being generated by encryption of the script digest with the encryption key, and encrypted one or more control codes being generated by encryption of one or more control codes among the plurality of control codes with the encryption key, the control method comprising:

carrying out a loading process for loading each of the plurality of control codes constituting the application program so as to execute each of the plurality of control codes;

carrying out an encryption key validation process for validating integrity of the encryption key used for decrypting the encrypted one or more control codes, wherein integrity of the encryption key signed by a signature validation key is validated with the signature validation key corresponding to an application vendor corresponding to the application ID; and carrying out a control code validation process for validating an integrity of the all unencrypted control codes by using the all unencrypted control codes among the plurality of control codes and the encrypted script digest, the control code validation process being performed after the encryption key validation process, wherein, in a first case where a first target control code is not encrypted, the first target control code of the plurality of control codes is loaded without executing both the encryption key validation process and the control code validation process, and wherein, in a second case where a second target control code is encrypted, the encryption key validation process and the control code validation process are executed, and then the second target control code is loaded in a case where the integrity of the encryption key and the integrity of the all unencrypted control codes are both validated.

8. The non-transitory storage medium according to claim 7, wherein the application program comprises a plurality of scripts including the plurality of control codes for the application program, and wherein a part of the plurality of control codes in the application program is encrypted on a script-by-script basis.

9. The non-transitory storage medium according to claim 7, wherein the application program includes an unencrypted dummy control code not required for executing the application, and the script digest is generated from the all unencrypted control codes without the unencrypted dummy control code.

* * * * *